United States Patent [19]

Wentzell

[11] Patent Number: 4,592,391

[45] Date of Patent: Jun. 3, 1986

[54] TUBE SLEEVE

[75] Inventor: Timothy H. Wentzell, South Windsor, Conn.

[73] Assignee: Combustion Engineering, Inc., Windsor, Conn.

[21] Appl. No.: 572,031

[22] Filed: Jan. 19, 1984

[51] Int. Cl.⁴ .................. F16L 55/12; F16L 55/16
[52] U.S. Cl. .................................. 138/98; 138/97; 29/157 R; 29/157 C
[58] Field of Search ................... 138/89, 97, 98; 29/157.3 C, 157.3 R, 157.4, 402.09, 402.11, 402.14, 402.15, 402.17; 411/24, 25, 26, 27, 28, 44, 54

[56] References Cited

U.S. PATENT DOCUMENTS

| 184,791 | 11/1876 | McConnell | 138/98 |
| 2,855,003 | 10/1958 | Thaxton | 138/90 |
| 3,692,059 | 9/1972 | Ice | 138/89 |
| 4,436,117 | 3/1984 | Martin | 138/89 |
| 4,474,216 | 10/1984 | Noe | 138/89 |
| 4,485,847 | 12/1984 | Wentzell | 138/98 X |

FOREIGN PATENT DOCUMENTS 864787  1/1953  Fed. Rep. of Germany ........ 138/89

Primary Examiner—James E. Bryant, III
Attorney, Agent, or Firm—L. James Ristas

[57] ABSTRACT

A repair sleeve assembly (12) secured entirely within a tube (16). A hollow tension member (18) has an enlarged head (26), a lower externally threaded stem (28) and a generally cylindrical body portion (30) intermediate the head and stem. A segmented sheath surrounds the tension member and includes a generally cylindrical nut member (24), a ring member (22) and a sleeve member (20), which are operatively arranged such that when the tension member is drawn downward, the enlarged head and lower ring member compress the sleeve to form seals against the tube wall. A tool for effecting the seal is also disclosed, including an inner rod (38) having an upper end (40) adapted to engage the lower end of the tension member, for aligning the tool relative to the repair assembly, and lugs (42) carried circumferentially on the rod to engage the tension member. A chuck member (44) is adapted to move longitudinally and rotationally with respect to the inner rod, and carries tangs (46) for engaging the nut member. The seal is effected by advancing the nut member relative to the stem, whereby the sleeve (20) is compressed between the head (26) and the ring (22) into engagement with the tube wall.

3 Claims, 3 Drawing Figures

TUBE SLEEVE

BACKGROUND OF THE INVENTION

The present invention relates to tube repair, and more particularly to securing a bypass member or sleeve within a tube.

Nuclear power steam supply systems, particularly the pressurized water type, include a large steam generator heat exchanger having tube and shell sides separated by a thick tube sheet. A recurring problem has arisen with such steam generators in that defects eventually cause leakage of radioactive, primary water from the tube side to the secondary, relatively clean water of the secondary side. The radioactivity level of the secondary side must remain within strict limits and accordingly the leaking tubes must be repaired during plant outages.

A variety of techniques have been proposed for repairing such tubes, but few have proven satisfactory. It is preferred that the tubes be sleeved to enable continued opertion of the tube and thereby take advantage of the full heat exchange capacity of the steam generator. Although the plugging is more expedient and is sometimes undertaken where excess steam generator capacity is available or the plant outage is of short duration, sleeving is usually preferred.

A particularly advantageous tube repair technique is described in co-pending U.S. Ser. No. 477,292 U.S. Pat. No. 4,485,847, "Compression Sleeve Tube Repair", which discloses a plug embodiment and a sleeve embodiment, both of which include means for cooperating with the tube sheet lower surface to secure the plug or sleeve against the tube wall. Such sleeve is particularly adapted to repairing defects caused by sludge or crud deposits immediately above the tube sheet. The advantages incliude quick installation time and easy removal should such need arise subsequent to installation and use. Also, a constant preload under both hot and cold conditions is maintained as a result of the preferred use of the tube material for the repair sleeve. Presently, the sleeve technique disclosed in U.S. Ser. No. 477,292 is conveniently used when the defect is within abouyt three or four feet from the tube sheet.

Occasionally, defects occur in locations many feet above the tube sheet, where it may become impossible or impractical to secure a sleeve in the tube while taking advantage of the backup, strength or stop surfaces available on or within the tube sheet. Accordingly, a need has been identified, to obtain many of the advantages associated with the referenced disclosure, while having greater flexibility as to where the repair device can be located within the tube.

SUMMARY OF THE INVENTION

The present invention provides a repair sleeve assembly secured entirely within a tube. It includes a hollow tension member having an enlarged head, a lower externally threaded stem, and a generally cylindrical body portion intermediate the head and stem, and a segmented sheath including a generally cylindrical nut member, ring member, and sleeve member, which are operatively arranged such that when the tension member is drawn downward, the enlarged head and lower ring member compress the sleeve to form seals against the tube wall. Thus, the fluid flowing through the tube bypasses the defect and the defect is isolated from the fluid by means of the upper and lower seals between the sleeve and the tube wall.

An important feature of the invention is that the nut member has the same outer diameter as the ring and sleeve members, allowing insertion of the entire repair assembly to the desired tube location. The lower ends of the tension member and nut member include slotted rims which are engageable with specially designed tooling for inserting and securing the repair assembly to the tube walls.

In a preferred embodiment, the invention further includes the special tool engageable with the repair assembly, wherein the tool includes an inner rod having an upper end adapted to engage the lower end of the hollow tension member, for aligning the tool relative to the repair assembly. Lug means carried circumferentially on the inner rod engage the slotted rim of the tension member, while a chuck member mounted for longitudinal and rotational movement with respect to the inner rod carries tangs for engaging the slit rim portion of the nut member.

Installation is efficiently performed by inserting the tool into the lower end of the repair assembly such that the lugs, tangs, slots, and slits are all engaged. The tool is then pushed into the tube opening until the desired location is reached, whereupon the chuck member is actuated to rotate the nut relative to the tensioning member. Upon the application of a predetermined torque, the tool is removed, leaving a repair sleeve assembly secured in place.

A major advantage of the present invention is the flexibility in sleeve placement within the tube, and the ease of sleeve removal by merely reversing the installation procedure.

BRIEF DESCRIPTION OF THE DRAWINGS

The preferred embodiment of the present invention is more fully described below with reference with the accompanying drawings, in which.

DESCRIPTION OF THE PREFERRED EMBODIMENT

Figure 1:
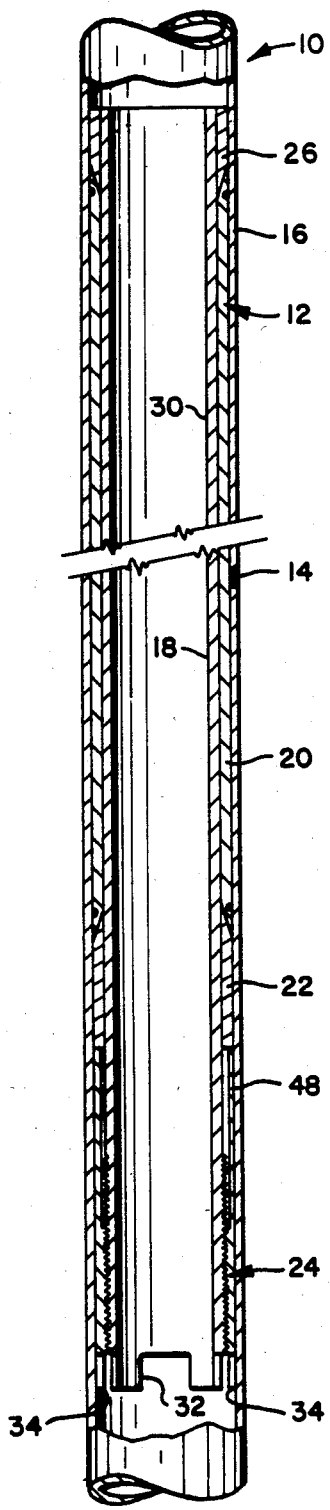
FIG. 1 is a partially cut-away view of a tube having the inventive sleeve repair assembly secured therein.

FIG. 1 shows a steam generator tube 10 within which is secured a bypass repair assembly 12. The bypass assembly extends above and below tube defect 14 in the tube wall 16.

The repair assembly 12 consists of four components, the tension member 18, the compression sleeve or ferrule member 20, the ring member 22, and the seal-energizing nut member 24. The repair assembly 12 is generally hollow cylinder to permit bypass flow through the tube, that must seal against the tube wall 16 above and below the defect 14, to prevent leakage of fluid from within the tube 10.

The basic sealing principles associated with the present invention are similar to those fully disclosed in co-pending U.S. Ser. No. 477,292 filed Mar. 21, 1983, for "Compression Sleeve Tube Repair", the disclosure of which is hereby incorporated by reference. These principles include expanding the upper and lower ends of the sleeve 20 by subjecting the sleeve to compressive loading from the tension member 18 carried within the sleeve, whereby the sleeve extremities are pressed against and plastically deformed into sealing engagement with the adjacent tube wall 16. This produces a mechanical seal that can be released after a period of operation of the steam generator, in the event sleeve replacement or other repair or maintenance operation is necessary.

In the present invention, the generally cylindrical, hollow tension member 18 includes an enlarged rigid head 26, a lower, externally threaded stem portion 28, and an enlongated body portion 30 intermediate the head and stem. The stem and body portion have substantially the same outer diameter. The stem portion 28 has at its lower extreme, slotted rim means 32 for permitting a remotely controlled tool, such as will be described herein below, to maintain the tension member 18 stationary while the sealenergizing nut member 24 is rotated or advanced along the stem portion 28.

As the nut 24 is advanced upwardly along the stem 28, the nut supports ring member 22 against the lower end of the hollow compression sleeve 20, and, in effect compresses the sleeve between the ring member 22 and the head portion 30 of the tension member 18. In the illustrated embodiment, the nut is advanced by rotation of a tool that engages slits in rim 34 in the lower portion of the nut.

Figure 2:
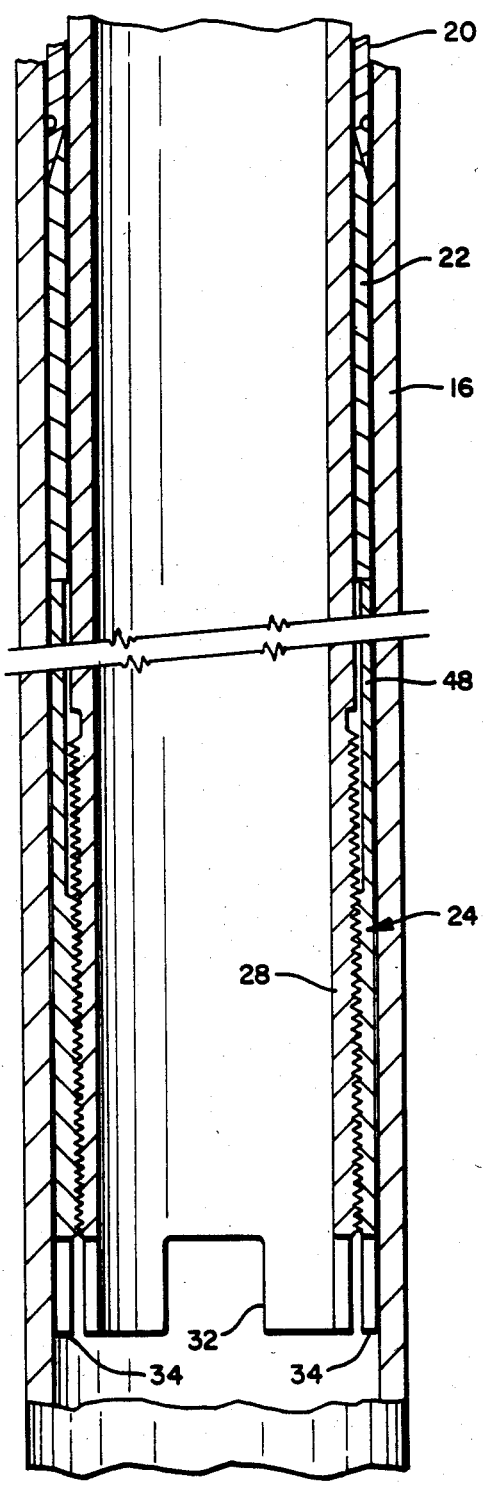
FIG. 2 is an enlarged view of the lower portion of the tube and repair assembly shown in FIG. 1.

FIG. 2 is an enlarged illustration of the lower portion of the tension member 18, showing in greater detail the relationship among the ring member 22, energizing nut member 24, and the stem portion 28 of the tension member.

Figure 3:
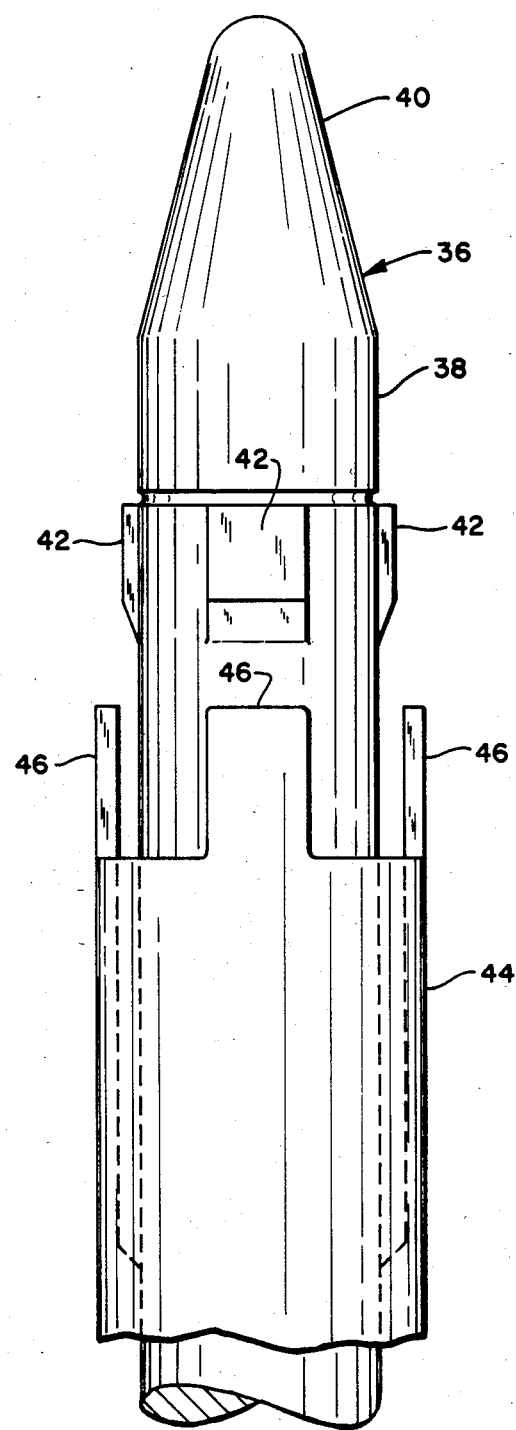
FIG. 3 is an elevation view of the preferred tool for insertion and securing the repair sleeve assembly within the tube.

FIG. 3 shows the preferred tool for inserting and securing the repair assembly 12 within the tube 10. The detailed description of the operative relationships among the structures shown in FIG. 2 will now be described in conjunction with the operation of the combination tool 36 shown in FIG. 3.

The repair assembly 12 is first placed over the upper end of the combination tool 36 so that the tool can run the assembly up into the tube 10 to the desired location such as depicted in FIG. 1, spanning the tube defect 14. The combination tool has an inner rod 38 having an alignment or nose portion 40 adapted to readily enter the hollow stem portion of the repair assembly 12, as shown in phantom in FIG. 2. Below the nose 40, the inner rod 38 has lugs 42 adapted to engage and prevent rotation of the slots 32 on the stem portion 28 of the repair assembly 12. A chuck member 44 is concentrically disposed about and adapted to rotate and advance longitudinally with respect to the inner rod 38, and carries tangs 46 adapted to engage the slits 34 at the lower extremity of the energizing nut member 24.

As shown in FIG. 2, the energizing nut member 24 is somewhat elongated and preferably includes a neck portion 48 adapted to support the expander ring 22 and urge the ring against the lower end of the compression sleeve 20 when the nut 24 has been threaded to a predetermined torque. Thus, the chuck member advances the energizing nut 24 independently of the initial position of nut 24 relative to stem 28.

The first step of the installation sequence would normally be placing the compression sleeve 20, ring member 22, and nut 24 onto the tension member 18 to form a substantially continuous segmented sheath around the stem 28 and body portions 30 such that the upper extremity of the sleeve contacts the head portion 30. This initial alignment of the sleeve ring and nut relative the tension member is a manual operation. The sheath has a substantially uniform outer diameter slightly less than that of the tube inner diameter. The entire repair assembly 12 is then placed onto the combination tool 36, and located within the tube 10. The only required actuation is the rotation of the chuck member 44 while the inner rod is rigidly supported against rotational motion. The ring 22 transmits a linear force to the sleeve 20. As more fully discussed in the incorporated disclosure, the sleeve 20 is thereby compressed and the tapered ends 50, 52 are outwardly expanded at the tapered, wedged mating surfaces 54, 56 of the head 26 and ring 22 such that the sealing surfaces between the sleeve and tube wall are energized.

The bypass sleeve arrangement of the present invention thus does not require a lower expansion stop surface such as a tube sheet. The expansion control of the sleeve 20 is accomplished by the self-limiting effects of the torque on the chuck member 44, producing plastic strain in the sleeve, resulting in either simultaneous or alternating expansion of the sleeve extremities. In order to control this expansion, the torque which is transmitted by longitudinal tension in the tension member must be divided between both upper and lower extremities of the sleeve. This can be accomplished simply by insuring a low friction coefficient between the mating surfaces 54, 56 of the head 26 and ring 22 with respect to the sleeve surfaces 50, 52.

I claim:
1. A repair sleeve assembly located entirely within a tube, comprising:
   a generally cylindrical, hollow tension member (18) having an enlarged head (26), a lower, externally threaded stem (28) and an enlongated body portion (30) intermediate the head and stem, said stem and body portion having substantially the same outer diameter;
   a generally elongated, cylindrical nut member (24) having a threaded portion engaging said threaded stem (28);
   a generally cylindrical ring member slideably surrounding said body portion (30) and adapted to advance along said body portion as said nut member (24) advances along the stem (28);
   a generally cylindrical, hollow compression sleeve member (20) surrounding said body portion (30) between said head (26) and said ring (22), wherein;
   (a) said nut member (24), ring member (22) and sleeve member (20) form a segmented sheath of substantially uniform outer diameter around the stem (28) and body (30) portions of the tension member (18);
   (b) said head and the upper end of the sleeve member have oppositely facing, overlapping tapered surfaces (50, 54);
   (c) said ring and the lower end of the sleeve member have oppositely facing, overlapping tapered surfaces (56, 52);
   (d) said stem portion has slotted rim means (32) at the lower end thereof for maintaining the tension member stationary while the nut member is rotated along the stem;
   (e) said nut member has slit rim means (34) on the lower end thereof for rotating the nut along the stem, such that;
   said tension member (18), compression sleeve member (20), and ring member (22) are operatively arranged whereby when the tension member is drawn downward relative to the nut, the oppositely facing tapered surfaces (50, 54 and 56, 52) advance wedge-like over each other, radially expanding the upper and lower circumferential outer surfaces at the ends of said sleeve into deformed circumferential contact with the adjacent tube wall (16), forming respective upper and lower seals thereagain.

2. The repair sleeve assembly of claim 1 wherein said nut member (24) further includes an elongated neck portion (48) extending above the threaded portion.

3. The repair sleeve assembly of claim 1 in combination with an insertion tool, said combination comprising:

an inner rod (38) having (a) an upper end (40) adapted to engage the hollow stem portion (28) of the tension member for aligning the tool with respect to the repair assembly, and (b) lug means (42) immediately below said upper end for engaging the slotted rim (32);

a chuck member (44) concentrically disposed about and longitudinally movable with respect to the inner rod (38), said chuck member having tang means (46) at its upper end for engaging the slit rim (34) on the nut member (24);

whereby when the lug means, tag means, slotted rim and slit rim are engaged, the nut member may be rotated and advanced relative to the stem.

* * * * *